(12) United States Patent
Chang et al.

(10) Patent No.: US 8,384,849 B2
(45) Date of Patent: Feb. 26, 2013

(54) LCD AND LIGHT GUIDE PLATE THEREOF

(75) Inventors: Wei-Tien Chang, Hsin-Chu (TW); Jing-Huan Liao, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 0 days.

(21) Appl. No.: 13/473,813

(22) Filed: May 17, 2012

(65) Prior Publication Data

US 2012/0224123 A1  Sep. 6, 2012

Related U.S. Application Data

(62) Division of application No. 12/402,655, filed on Mar. 12, 2009, now Pat. No. 8,203,667.

(30) Foreign Application Priority Data

Oct. 30, 2008 (TW) .............................. 97141825 A

(51) Int. Cl.
*G02F 1/13357* (2006.01)

(52) U.S. Cl. .......................................... 349/65; 362/626

(58) Field of Classification Search .................. None
See application file for complete search history.

(56) References Cited

U.S. PATENT DOCUMENTS

| | | | |
|---|---|---|---|
| 5,485,354 A | 1/1996 | Ciupke et al. | |
| 6,633,722 B1 | 10/2003 | Kohara et al. | |
| 6,788,358 B1 | 9/2004 | Kim et al. | |
| 7,527,415 B2 | 5/2009 | Shiau et al. | |
| 8,203,667 B2 * | 6/2012 | Chang et al. | 349/65 |
| 2008/0130316 A1 | 6/2008 | Kinoshita et al. | |
| 2009/0207344 A1 | 8/2009 | Ono et al. | |

FOREIGN PATENT DOCUMENTS

| | | |
|---|---|---|
| CN | 1918428 | 2/2007 |
| JP | 2001266627 A | 9/2001 |
| JP | 2006-66128 | 3/2006 |
| JP | 2011003526 A | 1/2011 |
| JP | 2011090832 A | 5/2011 |
| TW | I266117 | 11/2006 |
| TW | M332863 | 11/2007 |
| TW | M326642 | 2/2008 |
| TW | M329186 | 3/2008 |
| TW | M300824 | 3/2009 |

OTHER PUBLICATIONS

English translation of abstract and pertinent parts of CN 1918428 (published on Feb. 21, 2007).
English translation of abstract and pertinent parts of JP 2006-66128 (published on Mar. 9, 2006).
English translation of abstract of M300824.
English translation of abstract of M326642.
English translation of abstract of M329186.
English translation of abstract of M332863.
English translation of abstract of I266117.

* cited by examiner

*Primary Examiner* — Sarah Hahm
(74) *Attorney, Agent, or Firm* — McClure, Qualey & Rodack, LLP

(57) ABSTRACT

A light guide plate includes a main body, a main reflective structure and an auxiliary reflective structure. The main reflective structure has a first included angle and a second included angle with respect to a bottom surface of the main body. The auxiliary reflective structure is adjacent to the main reflective structure and has a third included angle and a fourth included angle with respect to the bottom surface. A height difference between the main reflective structure and the auxiliary reflective structure ranges between 1.5 micrometer and 5 micrometer, and a bottom width of the auxiliary reflective structure on the bottom surface is smaller than a bottom width of the main reflective structure on the bottom surface. A liquid crystal display is also disclosed herein.

20 Claims, 4 Drawing Sheets

LCD AND LIGHT GUIDE PLATE THEREOF

RELATED APPLICATIONS

The present application is a divisional of U.S. application Ser. No. 12/402,655, filed on Mar. 12, 2009, which was based on, and claims priority from, Taiwan Patent Application Serial Number 97141825, filed Oct. 30, 2008, the disclosure of which is hereby incorporated by reference herein in its entirely.

BACKGROUND

1. Field of Invention

The present invention relates to a light guide plate. More particularly, the present invention relates to a light guide plate with micro-structural light guides in an LCD.

2. Description of Related Art

In a conventional LCD, a light guide plate is mostly fabricated with the aid of screen printing, laser beam or etching manner. Light emitted from the light guide plate is usually modified by changing structures of the light guide plate, so as to modify illumination uniformity of the emitted light.

In order to make emitted angles of the emitted light correspond with the design of LCD and to take into consideration viewing angles of LCD, three to four optical films (including light diffusion films, brightness enhancement films, etc.) are usually desired such that LCD can have required brightness when operating. However, this costs more in material and assembling.

SUMMARY

In accordance with one embodiment of the present invention, a light guide plate is provided. The light guide plate comprises a main body having an incident face and a bottom surface, a main reflective structure and an auxiliary reflective structure. The bottom surface is connected to the incident face. The main reflective structure is disposed on the bottom surface and has a first inclined surface and a second inclined surface smaller than the first inclined surface. The auxiliary reflective structure is disposed on the bottom surface and has a third inclined surface and a fourth inclined surface larger than the third inclined surface. The auxiliary reflective structure and the main reflective structure have an interval therebetween, in which the interval ranges between 0.2 micrometer ($\mu$m) and 0.5 micrometer ($\mu$m), and a bottom width of the auxiliary reflective structure on the bottom surface is smaller than a bottom width of the main reflective structure on the bottom surface.

In accordance with another embodiment of the present invention, a light guide plate is provided. The light guide plate comprises a main body having an incident face and a bottom surface, a main reflective structure and an auxiliary reflective structure. The bottom surface is connected to the incident face. The main reflective structure has a first included angle and a second included angle with respect to the bottom surface. The auxiliary reflective structure is adjacent to the main reflective structure and has a third included angle and a fourth included angle with respect to the bottom surface. A height difference between the main reflective structure and the auxiliary reflective structure ranges between 1.5 micrometer ($\mu$m) and 5 micrometer ($\mu$m), and a bottom width of the auxiliary reflective structure on the bottom surface is smaller than a bottom width of the main reflective structure on the bottom surface.

In accordance with yet another embodiment of the present invention, a liquid crystal display is provided. The liquid crystal display comprises a light guide plate, a light source and a liquid crystal display panel. The light guide plate comprises a main body having an incident face and a bottom surface and a plurality of reflective structure groups, in which the bottom surface is connected to the incident face and the reflective structure groups are disposed on the bottom surface. The light source is disposed with respect to the incident face. The liquid crystal display panel is disposed with respect to the light guide plate. An interval between adjacent two of the reflective structure groups ranges between 50 micrometer ($\mu$m) and 500 micrometer ($\mu$m). Each of the reflective structure groups comprises a main reflective structure and at least one auxiliary reflective structure, and a bottom width of the auxiliary reflective structure on the bottom surface is smaller than a bottom width of the main reflective structure on the bottom surface.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference to the accompanying drawings as follows.

DESCRIPTION OF THE PREFERRED EMBODIMENTS

In the following detailed description, the embodiments of the present invention have been shown and described. As will be realized, the invention is capable of modification in various respects, all without departing from the invention. Accordingly, the drawings and description are to be regarded as illustrative in nature, and not restrictive.

Figure 1A:
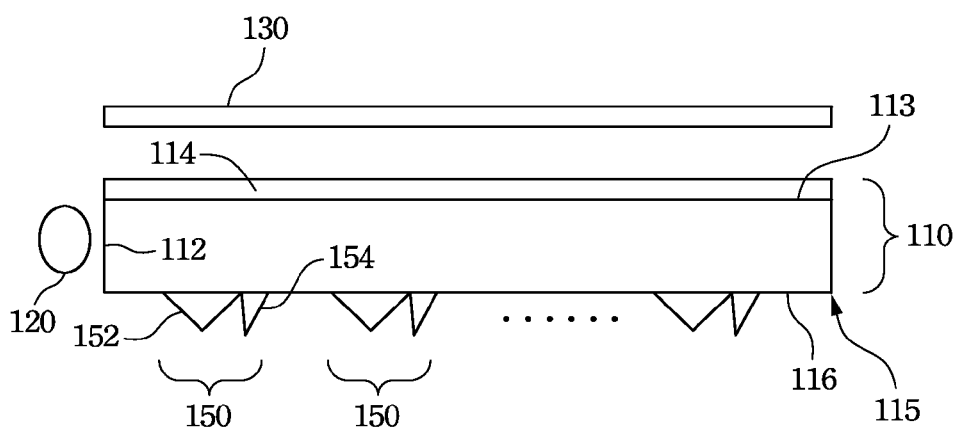
FIG. 1A illustrates an LCD according to one embodiment of the present invention.
Figure 1B:
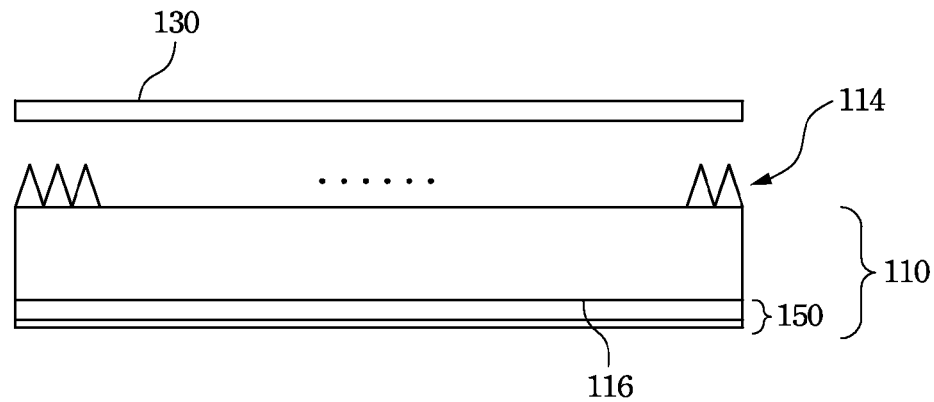
FIG. 1B illustrates a side view of the embodiment shown in FIG. 1A.

FIG. 1A illustrates an LCD according to one embodiment of the present invention. FIG. 1B illustrates a side view of the embodiment shown in FIG. 1A. Refer to FIGS. 1A and 1B. The LCD 100 includes a light guide plate 110, a light source 120 and a liquid crystal display panel 130. Further, the backlight module includes a light guide plate 110 and a light source 120. The light guide plate 110 includes a main body 115 having an incident face 112, a top surface 113, and a bottom surface 116, V-shaped structures 114, and a plurality of reflective structure groups 150, in which the V-shaped structures 114 are light guide structures with V-shaped grooves disposed on the top surface 113. In FIG. 1A, since the extension direction of the V-shaped grooves is perpendicular to that of the reflective structure groups 150, the V-shaped cross section of the V-shaped structures 114 cannot be seen but only the rectangle-shaped cross section. In other embodiments, the extension direction of the V-shaped grooves may include or incline an acute angle, a 45° angle, or an obtuse angle with that of the reflective structure groups 150.

As shown in FIG. 1A, the top surface 113 and the bottom surface 116 both are connected to the incident face 112, the V-shaped structures 114 are disposed on the top surface, and the reflective structure groups 150 are disposed on the bottom surface 116. In one embodiment, two adjacent reflective structure groups 150 have an interval, and the interval ranges between 50 micrometer (μm) and 500 micrometer (μm). Furthermore, the light source 120 is disposed with respect to the incident face 112, and the LCD panel 130 is disposed with respect to the V-shaped structures 114, such that emitted lights of the light source 120 can be transmitted through the incident face 112 into the light guide plate 110 and emitted through the V-shaped structures 114 to the LCD panel 130 after being reflected by the reflective structure groups 150 on the bottom surface 116. Thus, in opposition to the bottom surface 116, the V-shaped structures 114 facing the LCD panel 130 are provided as the emission face of the light guide plate 110.

In addition, each of the reflective structure groups 150 can include a main reflective structure 152 and an auxiliary reflective structure 154. On the bottom surface 116 the bottom width of the auxiliary reflective structure 154 is smaller than the bottom width of the main reflective structure 152. The auxiliary reflective structure 154 and the main reflective structure 152 have an interval therebetween, in which the interval ranges between 0.2 μm and 0.5 μm. Moreover, a height of the main reflective structure 152 is different from that of the auxiliary reflective structure 154, resulting in a height difference therebetween. In one embodiment, the height of the main reflective structure 152 is higher than that of the auxiliary reflective structure 154; in another embodiment, the height of the auxiliary reflective structure 154 is higher than that of the main reflective structure 152; however, which one is higher than the other is determined by the requirements in practice and not limited herein.

As shown in FIG. 1B, the V-shaped structures 114 are the light guide structures with V-shaped grooves, and the extension direction thereof is perpendicular or substantially perpendicular to that of the reflective structure groups 150. Compared to FIG. 1A, FIG. 1B merely shows the rectangle-shaped cross section of the reflective structure groups 150 but fails to show the V-shaped cross section of the reflective structure groups 150. Furthermore, since the height of the main reflective structure 152 is different from that of the auxiliary reflective structure 154, there is a height difference between the main reflective structure 152 and the auxiliary reflective structure 154, such that the rectangle-shaped cross section of the reflective structure groups 150 shows different crest lines.

Figure 2:
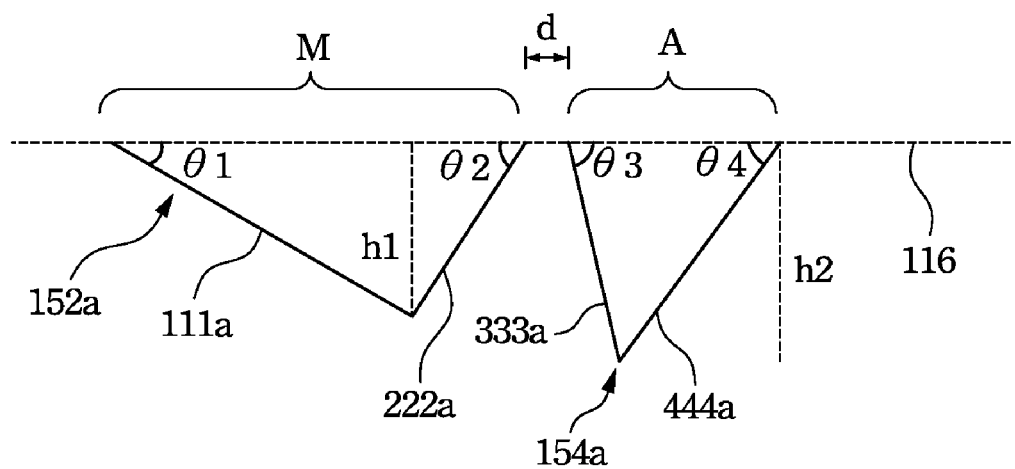
FIG. 2 illustrates the reflective structure group according to a first embodiment of the present invention.

FIG. 2 illustrates the reflective structure group according to a first embodiment of the present invention. The reflective structure group includes the main reflective structure 152a and the auxiliary reflective structure 154a, in which both of them are protrusions protruded from the bottom surface 116 and have an interval d therebetween, and the interval d ranges between 0.2 μm and 0.5 μm. The main reflective structure 152a has a first inclined surface 111a and a second inclined surface 222a protruded from the bottom surface 116 and the first inclined surface 111a and the second inclined surface 222a have the included angles θ1 and θ2 with respect to the bottom surface 116, respectively. The first inclined surface 111a is usually larger than the second inclined surface 222a.

The auxiliary reflective structure 154a has a third inclined surface 333a and a fourth inclined surface 444a protruded from the bottom surface 116 and the third inclined surface 333a and a fourth inclined surface 444a have the included angles θ3 and θ4 with respect to the bottom surface 116 respectively. The third inclined surface 333a is usually smaller than the fourth inclined surface 444a.

As shown in FIG. 2, the main reflective structure 152a and the auxiliary reflective structure 154a respectively have the inclined surfaces 111a, 222a, 333a, and 444a having the included angles θ1, θ2, θ3, and θ4 with respect to the bottom surface 116. The main reflective structure 152a is closer to the light source than the auxiliary reflective structure 154a is, and the sequence of the included angles is determined based on the distances from the corresponding inclined surfaces to the incident face. That is, for the four included angles in this embodiment, the included angle θ1 is closest to the incident face, then the included angles θ2 and θ3, and the included angle θ4 is farthest from the incident face. In one embodiment, the included angle θ1 is smaller than the included angle θ2, and the included angle θ3 is larger than the included angle θ4, for example, the included angle θ1 ranges between 0.2° and 10°, the included angle θ2 ranges between 30° and 50°, the included angle θ3 ranges between 70° and 110°, and the included angle θ4 ranges between 30° and 50°.

In addition, the main reflective structure 152a on the bottom surface 116 has a bottom width M, and the auxiliary reflective structure 154a on the bottom surface 116 has a bottom width A, where the bottom width M is larger than the bottom width A. In one embodiment, the bottom width M ranges between 40 μm and 70 μm, and the bottom width A ranges between 1 μm and 10 μm. Further, the main reflective structure 152a has a height h1, the auxiliary reflective structure 154a has a height h2, and the height difference of them ranges between 1.5 μm and 5 μm.

Figure 3:
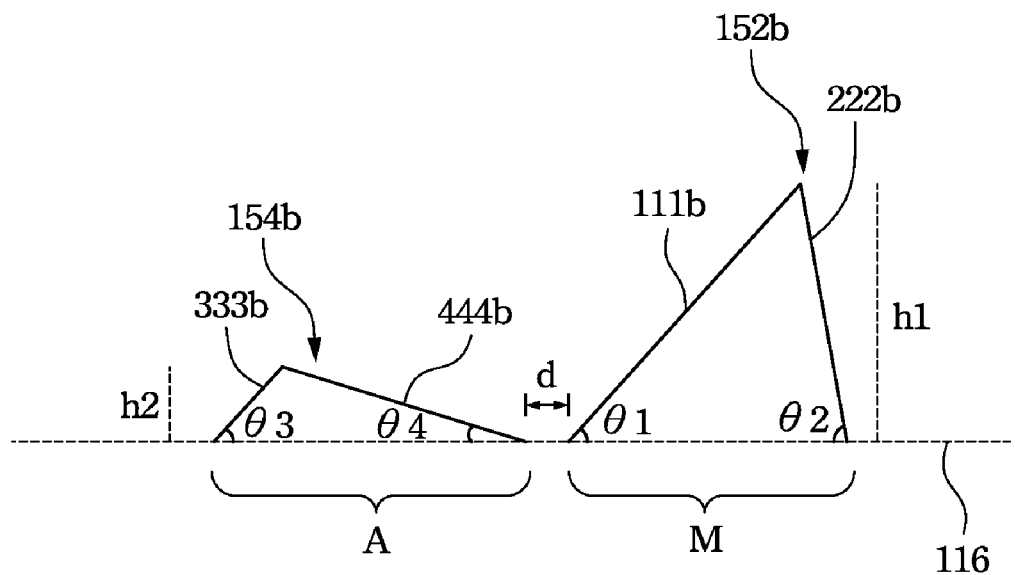
FIG. 3 illustrates the reflective structure group according to a second embodiment of the present invention.

FIG. 3 illustrates the reflective structure group according to a second embodiment of the present invention. The main reflective structure 152b and the auxiliary reflective structure 154b of FIG. 3 are indentations indented into the bottom surface 116 and have the interval d therebetween as well, in which the interval d can range between 0.2 μm and 0.5 μm. The main reflective structure 152b has a first inclined surface 111b and a second inclined surface 222b indented into the bottom surface 116 and the first inclined surface 111b and the second inclined surface 222b have the included angles θ1 and θ2 with respect to the bottom surface 116 respectively. The first inclined surface 111b is usually larger than the second inclined surface 222b. The auxiliary reflective structure 154b also has a third inclined surface 333b and a fourth inclined surface 444b indented into the bottom surface 116 and having the included angles θ3 and θ4 with respect to the bottom surface 116 separately. The third inclined surface 333b is usually smaller than the fourth inclined surface 444b.

As shown in FIG. 3, the auxiliary reflective structure 154b and the main reflective structure 152b respectively have the inclined surfaces 111b, 222b, 333b, and 444b having the included angles θ3, θ4, θ1, and θ2 with respect to the bottom surface 116. The auxiliary reflective structure 154b is closer to the light source than the main reflective structure 152b is, and the sequence of the included angles is determined based on the distances from the corresponding inclined surfaces to the incident face. That is, for the four included angles in this embodiment, the included angle θ3 is closest to the incident face, then the included angles θ4 and θ1, and the included angle θ2 is farthest from the incident face. In one embodiment, the included angle θ1 is smaller than the included angle θ2, and the included angle θ3 is larger than the included angle θ4, for example, the included angle θ1 ranges between 30° and 50°, the included angle θ2 ranges between 70° and 110°, the included angle θ3 ranges between 30° and 50°, and the included angle θ4 ranges between 0.2° and 10°.

In addition, the bottom width M of the main reflective structure 152b on the bottom surface 116 is larger than the bottom width A of the auxiliary reflective structure 154b on the bottom surface 116, in which the bottom width M can range between 40 μm and 70 μm, and the bottom width A can range between 1 μm and 10 μm. Further, the height (or the depth) h1 of the main reflective structure 152b and the height (or the depth) h2 of the auxiliary reflective structure 154b have a difference as well, which ranges between 1.5 μm and 5 μm.

Figure 4:
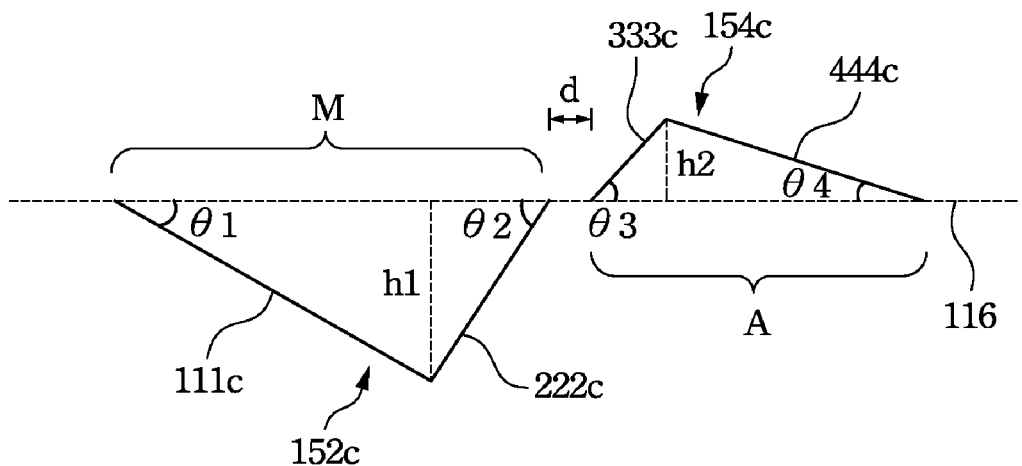
FIG. 4 illustrates the reflective structure group according to a third embodiment of the present invention.

FIG. 4 illustrates the reflective structure group according to a third embodiment of the present invention. The main reflective structure 152c has a first inclined surface 111c and a second inclined surface 222c protruded from the bottom surface 116 and the first inclined surface 111c and the second inclined surface 222c have the included angles θ1 and θ2 with respect to the bottom surface 116, respectively. The auxiliary reflective structure 154c has a third inclined surface 333c and a fourth inclined surface 444c indented into the bottom surface 116 and having the included angles θ3 and θ4 with respect to the bottom surface 116 separately. The main reflective structure 152c and the auxiliary reflective structure 154c have the interval d therebetween as well and the interval d can range between 0.2 μm and 0.5 μm. The protruding inclined surfaces of the main reflective structure 152c have the included angles θ1 and θ2 with respect to the bottom surface 116, and the indenting inclined surfaces of the auxiliary reflective structure 154c have the included angles θ3 and θ4 with respect to the bottom surface 116.

As shown in FIG. 4, the main reflective structure 152c and the auxiliary reflective structure 154c respectively have the inclined surfaces having the included angles θ1, θ2, θ3, and θ4 with respect to the bottom surface 116. The main reflective structure 152c is closer to the light source than the auxiliary reflective structure 154c is, and the sequence of the included angles is determined based on the distances from the corresponding inclined surfaces to the incident face. That is, for the four included angles in this embodiment, the included angle θ1 is closest to the incident face, then the included angles θ2 and θ3, and the included angle θ4 is farthest from the incident face. In one embodiment, the included angle θ1 is smaller than the included angle θ2, and the included angle θ3 is larger than the included angle θ4.

In addition, the bottom width M of the main reflective structure 152c on the bottom surface 116 is also larger than the bottom width A of the auxiliary reflective structure 154c on the bottom surface 116, in which the bottom width M can range between 40 μm and 70 μm, and the bottom width A can range between 1 μm and 10 μm. Further, the height h1 of the main reflective structure 152c and the height (or the depth) h2 of the auxiliary reflective structure 154c have a difference as well, which ranges between 1.5 μm and 5 μm. In the present embodiment, since the main reflective structure 152c is the protrusion and the auxiliary reflective structure 154c is the indentation, the height difference is defined as an absolute difference between the height h1 and the height (or the depth) h2, where h1 and h2 both are positive.

Figure 5:
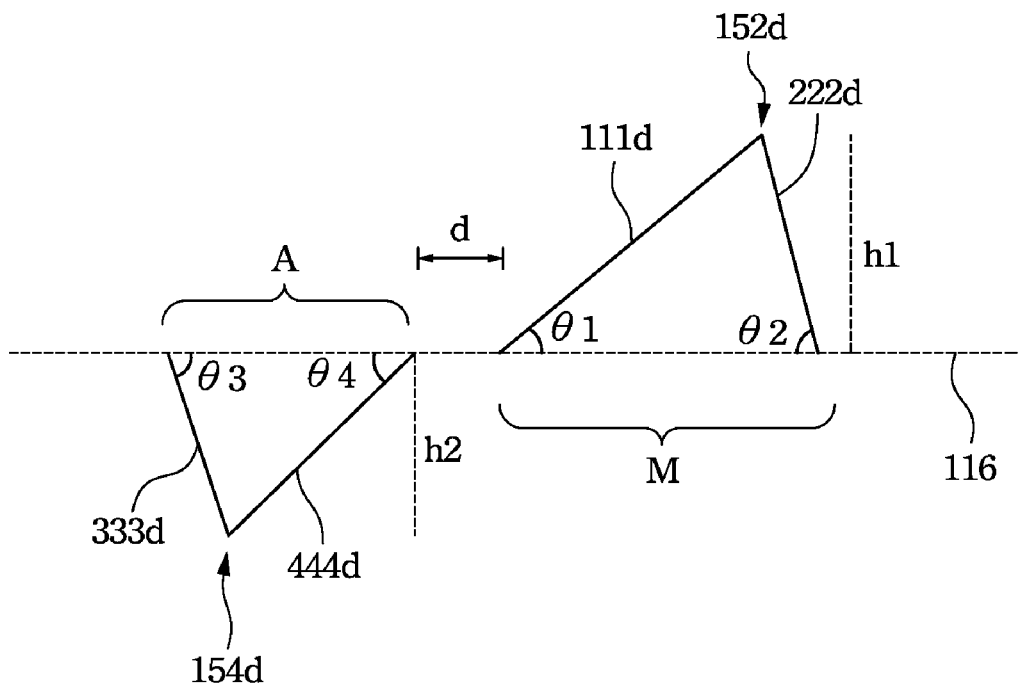
FIG. 5 illustrates the reflective structure group according to a fourth embodiment of the present invention.

FIG. 5 illustrates the reflective structure group according to a fourth embodiment of the present invention. The main reflective structure 152d has a first inclined surface 111d and a second inclined surface 222d indented into the bottom surface 116 and the first inclined surface 111d and the second inclined surface 222d have the included angles θ1 and θ2 with respect to the bottom surface 116 respectively. The auxiliary reflective structure 154d has a third inclined surface 333d and a fourth inclined surface 444d protruded from the bottom surface 116 and the third inclined surface 333d and a fourth inclined surface 444d have the included angles θ3 and θ4 with respect to the bottom surface 116 respectively. The main reflective structure 152d and the auxiliary reflective structure 154d have the interval d therebetween as well and the interval d can range between 0.2 μm and 0.5 μm. The indenting inclined surfaces of the main reflective structure 152d have the included angles θ1 and θ2 with respect to the bottom surface 116, and the protruding inclined surfaces of the auxiliary reflective structure 154d have the included angles θ3 and θ4 with respect to the bottom surface 116.

As shown in FIG. 5, the auxiliary reflective structure 154d and the main reflective structure 152d respectively have the inclined surfaces having the included angles θ3, θ4, θ1 and θ2 with respect to the bottom surface 116. The auxiliary reflective structure 154d is closer to the light source than the main reflective structure 152d is, and the sequence of the included angles is determined based on the distances from the corresponding inclined surfaces to the incident face. That is, for the four included angles in this embodiment, the included angle θ3 is closest to the incident face, then the included angles θ4 and θ1, and the included angle θ2 is farthest from the incident face. In one embodiment, the included angle θ1 is smaller than the included angle θ2, and the included angle θ3 is larger than the included angle θ4.

In addition, the bottom width M of the main reflective structure 152d on the bottom surface 116 is also larger than the bottom width A of the auxiliary reflective structure 154d on the bottom surface 116, in which the bottom width M can range between 40 μm and 70 μm, and the bottom width A can range between 1 μm and 10 μm. Further, the height (or the depth) h1 of the main reflective structure 152d and the height h2 of the auxiliary reflective structure 154d have a difference as well, which ranges between 1.5 μm and 5 μm. In the present embodiment, since the main reflective structure 152d is the indentation and the auxiliary reflective structure 154d is the protrusion, the height difference is defined as an absolute difference between the height (or the depth) h1 and the height h2, where h1 and h2 both are positive.

Figure 6:
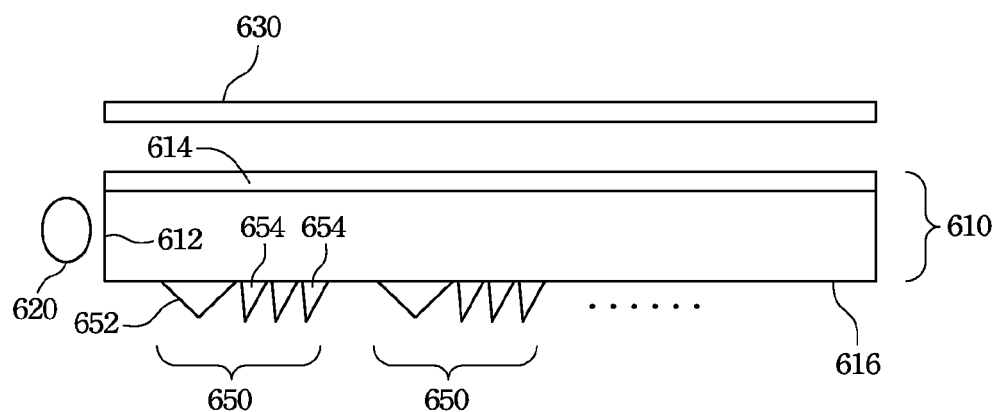
FIG. 6 illustrates an LCD according to another embodiment of the present invention.

FIG. 6 illustrates an LCD according to another embodiment of the present invention. The LCD 600 includes the light guide plate 610, the light source 620, the optical films (not shown) and the liquid crystal display panel 630, or the backlight module includes the light guide plate 610, the light source 620, and, the optical films, in which the incident face 612, the V-shaped structures 614, the bottom surface 616 and the reflective structure groups 650 of the light guide plate 610 are similarly disposed as the embodiment shown in FIG. 1A, and two adjacent reflective structure groups 650 have an interval ranging between 50 μm and 500 μm. In this embodiment, each of the reflective structure groups 650 can include a main reflective structure 652 and a plurality of auxiliary reflective structures 654, in which the bottom width of each of the auxiliary reflective structures 654 is smaller than the bottom width of the main reflective structure 652 on the bottom surface 616. In one embodiment, the bottom width of the main reflective structure 652 ranges between 40 μm and 70 μm, and the bottom width of the auxiliary reflective structure 654 ranges between 1 μm and 10 μm. Further, the main reflective structure 652 and the auxiliary reflective structure 654 being adjacent to the main reflective structure 652 have an interval therebetween, which can range between 0.2 μm and 0.5 μm, and two adjacent auxiliary reflective structures 654 have an interval therebetween as well, which can range between 0.2 μm and 0.5 μm.

In addition, the height of the main reflective structure 652 is different from that of the auxiliary reflective structure 654, resulting in a height difference therebetween, and the main reflective structure 652 and the auxiliary reflective structure 654 can be designed to be protrusions protruded from the bottom surface 616 or indentations indented into the bottom surface 616. The height of the main reflective structure 652 also can be designed to be higher or lower than that of the auxiliary reflective structure 654 based on the requirements in practice. In one embodiment, the height difference between the main reflective structure 652 and the auxiliary reflective structure 654 ranges between 1.5 μm and 5 μm.

Furthermore, the included angles, the heights (or the depth) or the quantity of the light guides in the embodiments described above can be adapted in accordance with different distances from the light source to the positions in the light guide plate. That is, the included angles, the heights (or the depth) or the quantity of the light guide plate can not only uniform, but also various.

Figure 7:
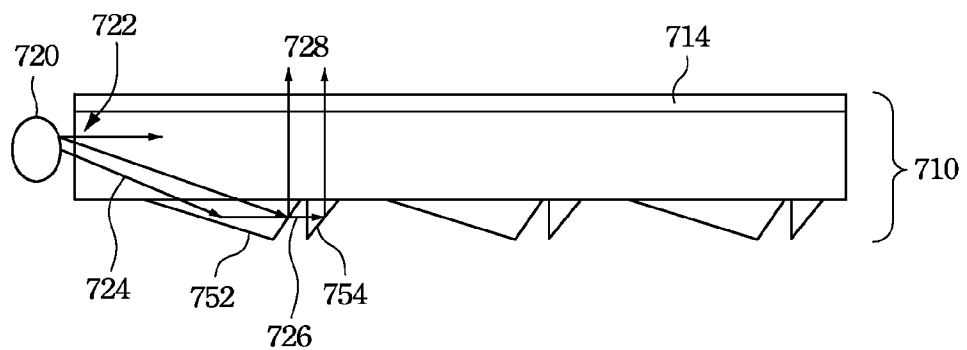
FIG. 7 illustrates the light path going through the LCD according to one embodiment of the present invention.

FIG. 7 illustrates a diagram showing the light path going through the backlight module of the LCD according to one embodiment of the present invention. It is an example that the main reflective structure is closer to the light source than the auxiliary reflective structure is and the main reflective structure and the auxiliary reflective structure both are protrusions. As shown in FIG. 7, when emitted lights 722 of the light source 720 are transmitted into the light guide plate 710, a part 724 of the emitted lights 722 of the light source 720 is/are reflected by the main reflective structure 752 and emit(s) outside the light guide plate 710 through the V-shaped structures 714. However, another part 726 of the emitted lights 722 of the light source 720 still emit(s) from the main reflective structure 752 or transmit(s) through the main reflective structure 752. At that moment, the part 726 of the emitted lights 722 of the light source 720 enter(s) into the auxiliary reflective structure 754, and it/them is/are then reflected by the auxiliary reflective structure 754 and emit(s) outside the light guide plate 710 through the V-shaped structures 714. In other words, the mainly emitted lights 728 includes the emitted light(s) 724 reflected by the main reflective structure 752 and the emitted light(s) 726 reflected by the auxiliary reflective structure 754. Therefore, the quantity or the strength of the mainly emitted lights 728 may be closer to that of the emitted lights 722 as the same as possible. As a result, the light leaking out of the light guide plate 710 can be decreased, and the utilization efficiency of the light source 720 can be significantly increased.

For the foregoing embodiments, the LCD and the light guide plate thereof can be applied such that the lights emitted from the light guide plate would gather following the direction of right viewing angle of LCD, so as to decrease the light leaking out of the light guide plate and to increase the light utilization efficiency of the light guide plate, enhancing the brightness of the LCD. In addition, optical films (e.g. brightness enhancement film, BEF) desired in the backlight module can be saved as well when the utilization efficiency of the light increases, to significantly save the cost of the optical films and the cost for assembling the backlight module.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A light guide plate, comprising:
a main body having an incident face and a bottom surface connected to the incident face;
a main reflective structure having a first included angle and a second included angle with respect to the bottom surface, the first included angle being smaller than the second included angle; and
an auxiliary reflective structure being adjacent to the main reflective structure and having a third included angle and a fourth included angle with respect to the bottom surface, the third included angle being larger than the fourth included angle;
wherein a height difference between the main reflective structure and the auxiliary reflective structure ranges between 1.5 micrometer and 5 micrometer, and a bottom width of the auxiliary reflective structure on the bottom surface is smaller than a bottom width of the main reflective structure on the bottom surface.

2. The light guide plate of claim 1, wherein the bottom width of the auxiliary reflective structure on the bottom surface ranges between 1 micrometer and 10 micrometer, and the bottom width of the main reflective structure on the bottom surface ranges between 40 micrometer and 70 micrometer.

3. The light guide plate of claim 1, wherein the main reflective structure and the auxiliary reflective structure both are protrusions protruded from the bottom surface, and the first included angle, the second included angle, the third included angle, and the fourth included angle are sequentially apart from the incident face.

4. The light guide plate of claim 3, wherein the first included angle ranges between 0.2° and 10°, and the second included angle ranges between 30° and 50°.

5. The light guide plate of claim 3, wherein the third included angle ranges between 70° and 110°, and the fourth included angle ranges between 30° and 50°.

6. The light guide plate of claim 1, wherein the main reflective structure and the auxiliary reflective structure both are indentations indented into the bottom surface, and the third included angle, the fourth included angle, the first included angle, and the second included angle are sequentially apart from the incident face.

7. The light guide plate of claim 6, wherein the first included angle ranges between 30° and 50°, and the second included angle ranges between 70° and 110°.

8. The light guide plate of claim 6, wherein the third included angle ranges between 30° and 50°, and the fourth included angle ranges between 0.2° and 10°.

9. The light guide plate of claim 1, wherein the main reflective structure is a protrusion protruded from the bottom surface, the auxiliary reflective structure is an indentation indented into the bottom surface, and the first included angle, the second included angle, the third included angle, and the fourth included angle are sequentially apart from the incident face.

10. The light guide plate of claim 1, wherein the auxiliary reflective structure is a protrusion protruded from the bottom surface, the main reflective structure is an indentation indented into the bottom surface, and the third included angle, the fourth included angle, the first included angle, and the second included angle are sequentially apart from the incident face.

11. A liquid crystal display, comprising:
a light guide plate comprising a main body having an incident face and a bottom surface and a plurality of reflective structure groups, wherein the bottom surface is connected to the incident face and the reflective structure groups are disposed on the bottom surface;
a light source disposed with respect to the incident face; and
a liquid crystal display panel disposed with respect to the light guide plate;
wherein each of the reflective structure groups comprises a main reflective structure and at least one auxiliary reflective structure, the main reflective structure has a first included angle and a second included angle with respect to the bottom surface and the first included angle is smaller than the second included angle, the auxiliary reflective structure has a third included angle and a fourth included angle with respect to the bottom surface and the third included angle is larger than the fourth included angle;
wherein a height difference between the main reflective structure and the auxiliary reflective structure ranges between 1.5 micrometer and 5 micrometer, and a bottom width of the auxiliary reflective structure on the bottom surface is smaller than a bottom width of the main reflective structure on the bottom surface.

12. The liquid crystal display of claim 11, wherein the bottom width of the auxiliary reflective structure on the bottom surface ranges between 1 micrometer and 10 micrometer, and the bottom width of the main reflective structure on the bottom surface ranges between 40 micrometer and 70 micrometer.

13. The liquid crystal display of claim 11, wherein the main reflective structure and the auxiliary reflective structure both are protrusions protruded from the bottom surface, and the first included angle, the second included angle, the third included angle, and the fourth included angle are sequentially apart from the incident face.

14. The liquid crystal display of claim 13, wherein the first included angle ranges between 0.2° and 10°, and the second included angle ranges between 30° and 50°.

15. The liquid crystal display of claim 13, wherein the third included angle ranges between 70° and 110°, and the fourth included angle ranges between 30° and 50°.

16. The liquid crystal display of claim 11, wherein the main reflective structure and the auxiliary reflective structure both are indentations indented into the bottom surface, and the third included angle, the fourth included angle, the first included angle, and the second included angle are sequentially apart from the incident face.

17. The liquid crystal display of claim 16, wherein the first included angle ranges between 30° and 50°, and the second included angle ranges between 70° and 110°.

18. The liquid crystal display of claim 16, wherein the third included angle ranges between 30° and 50°, and the fourth included angle ranges between 0.2° and 10°.

19. The liquid crystal display of claim 11, wherein the main reflective structure is a protrusion protruded from the bottom surface, the auxiliary reflective structure is an indentation indented into the bottom surface, and the first included angle, the second included angle, the third included angle, and the fourth included angle are sequentially apart from the incident face.

20. The liquid crystal display of claim 11, wherein the auxiliary reflective structure is a protrusion protruded from the bottom surface, the main reflective structure is an indentation indented into the bottom surface, and the third included angle, the fourth included angle, the first included angle, and the second included angle are sequentially apart from the incident face.

* * * * *